United States Patent [19]

Takagi

[11] Patent Number: 5,710,948
[45] Date of Patent: Jan. 20, 1998

[54] CAMERA SYSTEM WITH COLOR TEMPERATURE METER

[75] Inventor: Tadao Takagi, Yokohama, Japan

[73] Assignee: Nikon Corporation, Tokyo, Japan

[21] Appl. No.: 384,483

[22] Filed: Feb. 3, 1995

Related U.S. Application Data

[63] Continuation of Ser. No. 188,779, Jan. 31, 1994, abandoned, which is a continuation-in-part of Ser. No. 65,262, May 21, 1993, abandoned.

[30] Foreign Application Priority Data

Jun. 9, 1992 [JP] Japan .................................. 4-174892
Feb. 17, 1993 [JP] Japan .................................. 5-027035
Mar. 3, 1993 [JP] Japan .................................. 5-043035

[51] Int. Cl.⁶ .......................... G03B 7/18; G03B 11/00; G03B 15/00; G03B 17/18
[52] U.S. Cl. .............. 396/50; 396/65; 396/225; 396/234; 396/300; 396/292
[58] Field of Search .................. 354/430, 432, 354/415, 475; 348/360, 655, 223–228, 64; 396/225, 233, 234, 292, 287, 159, 161, 162, 163, 50, 65, 300

[56] References Cited

U.S. PATENT DOCUMENTS

| | | | |
|---|---|---|---|
| 4,397,533 | 8/1983 | Naruse et al. | 354/289.1 X |
| 4,420,236 | 12/1983 | Taniguchi et al. | 354/21 |
| 4,738,526 | 4/1988 | Larish | 348/64 X |
| 4,763,146 | 8/1988 | Niikura | 348/64 X |
| 4,887,121 | 12/1989 | Pritchard | 354/430 |
| 4,918,470 | 4/1990 | Whiteside | 354/430 X |
| 4,949,117 | 8/1990 | Van Heyningen et al. | 348/64 X |
| 5,016,039 | 5/1991 | Sosa et al. | 354/430 |
| 5,086,314 | 2/1992 | Aoki et al. | 354/430 X |
| 5,109,248 | 4/1992 | Petrakos et al. | 354/430 X |
| 5,172,146 | 12/1992 | Wooldridge | 354/430 X |
| 5,227,836 | 7/1993 | Yasukawa et al. | 354/415 |
| 5,260,739 | 11/1993 | Nagata | 354/430 |
| 5,465,116 | 11/1995 | Suzuki | 348/223 |

FOREIGN PATENT DOCUMENTS

| | | |
|---|---|---|
| 58-86504 | 5/1983 | Japan . |
| 61-062288 | 3/1986 | Japan . |
| 1057889 | 3/1989 | Japan . |

*Primary Examiner*—W. B. Perkey
*Attorney, Agent, or Firm*—Oliff & Berridge, PLC

[57] ABSTRACT

A camera is equipped with an integral color temperature measurement mechanism. The color temperature measurement mechanism measures the color temperature of the light source illuminating the subject field and a display mechanism displays the color temperature information based on output from the color temperature measurement mechanism. The camera also includes a system that determines what kind of filter is recommended based on the output of the color temperature measurement mechanism and a display mechanism that displays the output of the filter determination.

29 Claims, 13 Drawing Sheets

CAMERA SYSTEM WITH COLOR TEMPERATURE METER

This is a Continuation of application Ser. No. 08/188,779 filed Jan. 31, 1994, now abandoned, which in turn is a Continuation-in Part of application Ser. No. 08/065,262 filed May 21, 1993, now abandoned.

BACKGROUND OF THE INVENTION

1. Field of the Invention

This invention relates to a camera having a color temperature meter.

2. Description of Related Art

Heretofore, a camera and a color temperature meter were two separate items. Accordingly, for a photographer to take color temperature into consideration and to use filters appropriately, it was necessary to carry both a camera and a color temperature meter. Therefore, mobility and usability of the camera declined because of the additional color temperature meter equipment required. Further, in operation, it was necessary to measure the color temperature using the color temperature meter and then switch to the camera to take the photograph, which could cause poor quality photographs due to inaccuracies between the camera and color temperature meter.

To use filters appropriately, selection of the color conversion filters to be placed on the photography lens was previously performed by the photographer. However, photographers with little knowledge of color temperature are unable to select the proper color conversion filter. Therefore, even when using a separate color temperature meter, incorrect color conversion filters can be selected due to a photographer's inexperience.

SUMMARY OF THE INVENTION

A primary object of this invention is to provide a camera equipped with a color temperature meter.

Another object of this invention is to provide a camera system that displays a recommendation for the appropriate type of color conversion filter based on the color temperature, thereby making it possible for photographers with little knowledge of color temperature to properly select a filter.

To achieve the above and other objects, this invention offers a camera endowed with a color temperature measurement mechanism for measuring the color temperature of the light source illuminating the subject field and a display mechanism for displaying color temperature information based on the output of the color temperature measurement mechanism.

This invention also offers a camera having a decision method for deciding which kind of filter is recommended based on the output of the color temperature measurement mechanism and a display mechanism that displays the output of the decision method.

With this invention, it is not necessary to carry a color temperature meter independent from the camera. It is also possible for photographers with little knowledge of color temperature to select the proper color conversion filter.

BRIEF DESCRIPTION OF THE DRAWINGS

FIG. 13 is a drawing showing a sample display of the display system when "exposure" is selected with the exposure and color temperature control device according to this invention.

FIG. 14 is a drawing showing a sample display of the display system when "color temperature" is selected with the exposure and color temperature control device according to this invention.

DETAILED DESCRIPTION OF PREFERRED EMBODIMENTS

Figure 1:
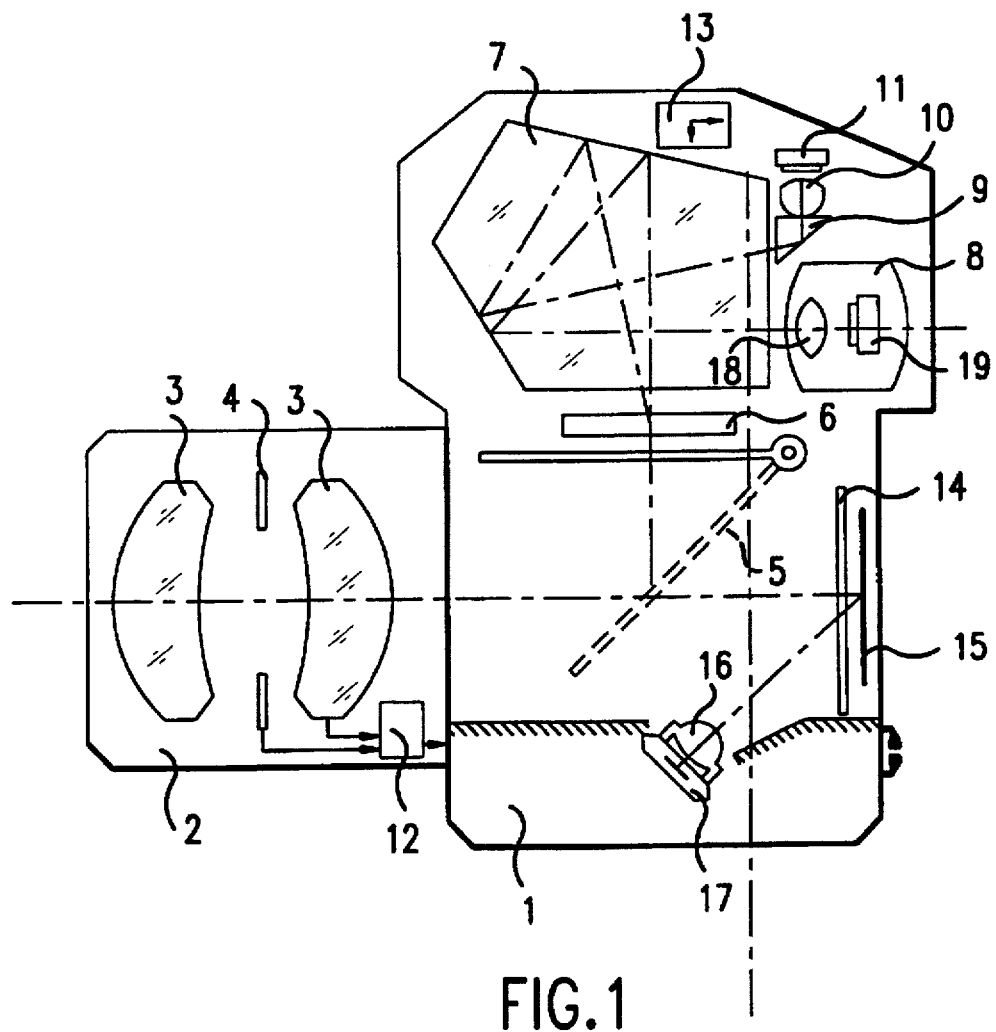
FIG. 1 is a schematic cross-section of a side view of a camera according to this invention.
Figure 4:
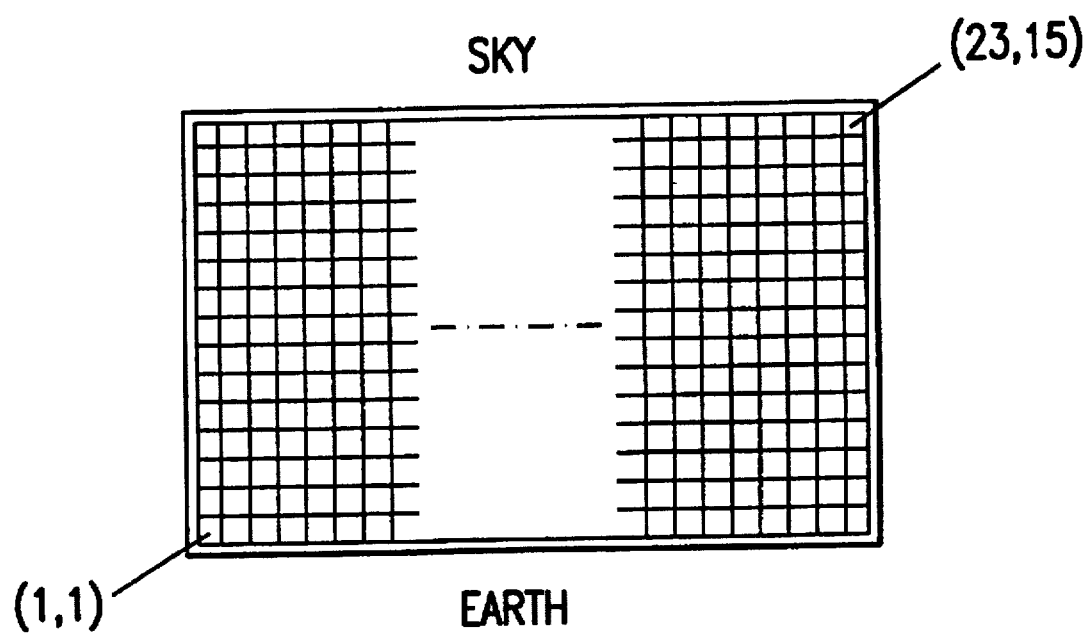
FIG. 4 is a drawing of the division pattern when the brightness on the screen is measured with the camera according to this invention.
Figure 5:
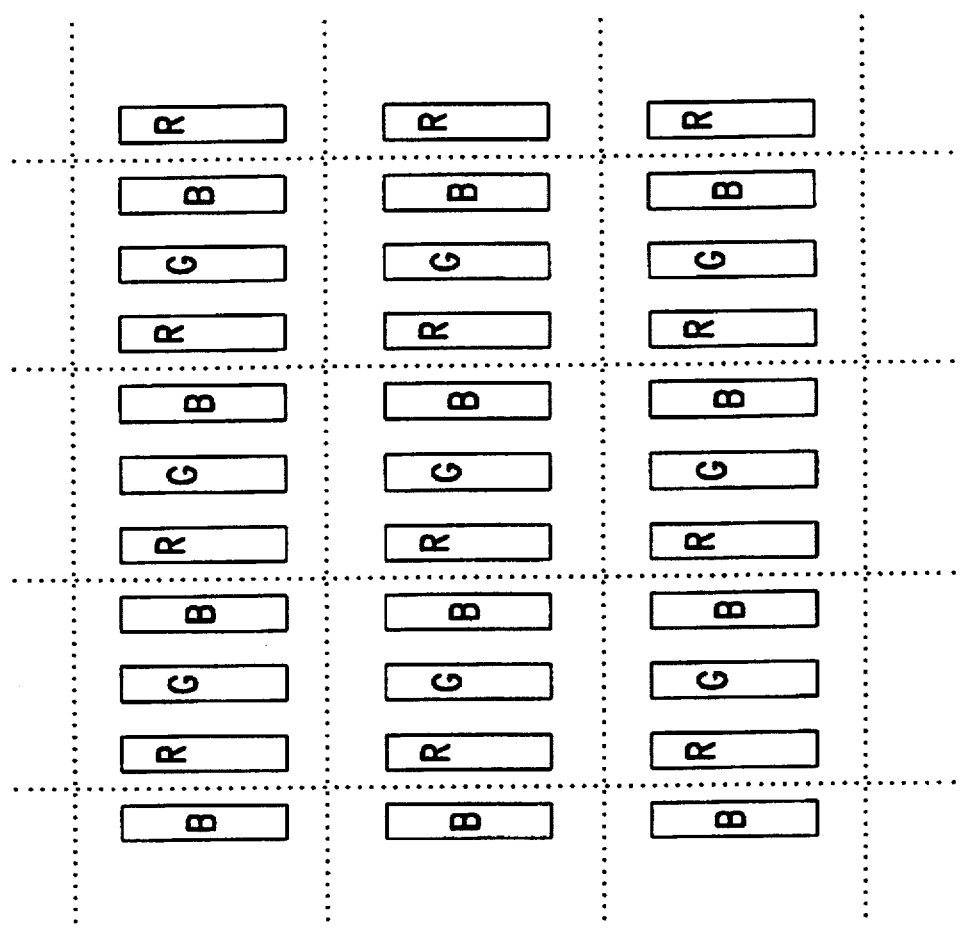
FIG. 5 is a schematic drawing showing the state of light receptors in the photometry element according to a camera of this invention.

FIG. 1 is a cross-sectional drawing of a camera according to the preferred embodiment of this invention. The camera comprises a camera body 1 and a photography lens barrel or tube 2. In operation, rays of light from the photographic subject pass through a photographic lens 3 and a diaphragm 4 in the photography lens tube 2. These rays are then reflected by a primary mirror 5 (shown by dotted lines) of the camera body 1. The rays then pass through a screen 6, a pentaprism 7 and an eyepiece lens 8 to reach the eye of the photographer. In addition, part of the ray of light passes from the pentaprism 7 to another prism 9 and a collection lens 10 to reach a photometry element 11. The photometry element 11 is made of second generation color CCDs, as used in video cameras. The photometry element measures the brightness of the light by dividing the subject field into 345 regions, 23 horizontally and 15 vertically as shown in FIG. 4. Also, the photometry element 11 is configured to measure the amount of the three colors red, green and blue in each region, as shown in FIG. 5.

A ROM 12 is coupled to the lens 3 and the diaphragm 4 and communicates photographic distance information X obtained from the position of the photographic lens 3 and lens data, including information on the stop value of the diaphragm 4, to the camera body 1.

A posture detection system 13 detects the posture of the camera body 1.

A second photometry element 17 is a flash light measurement element used for light adjustment when a flash system (not shown in the figure) is used. Light rays produced by the flash system are reflected from the subject, pass through the photographic lens 3, the diaphragm 4 and a shutter 14. Then, the rays are reflected off the surface of a film 15, and pass through a collection lens 16 used for flash light measurement to reach the second photometry element 17 used for the measurement of the light flash.

A third photometry element 19 is used in place of photometry element 11 as the element measuring light when a lens with a small information storage volume and no ROM is installed. Light that passes through the pentagon prism 7 reaches the photometry element 19 by passing through a condensing lens 18.

Figure 2:
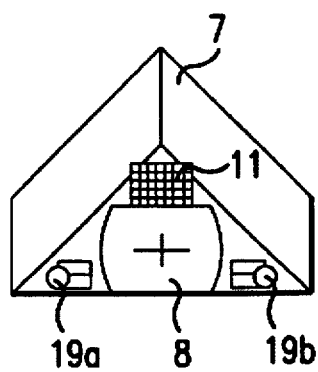
FIG. 2 is a schematic view of the first embodiment for the positioning of the photometry elements of this invention in a top view.

FIG. 2 shows a preferred embodiment of the positioning of the photometry elements 11 and 19. In this embodiment, a pair of photometry elements 19a and 19b are employed. The diagram is a view of the pentagon prism 7 from the eyepiece lens 8 side. While the photometry element 11 measures light using light rays at the top of the eyepiece lens 8, the pair of photometry elements 19 measure light using light rays on the left and right sides of the eyepiece lens 8. Measurement of the light is accomplished by dividing the area into 5 regions, one in the center and 4 around the edges. For the central region, a pair of elements on the right and left are overlaid on the photometry region, and their output is combined as the output of the central region.

Figure 3:
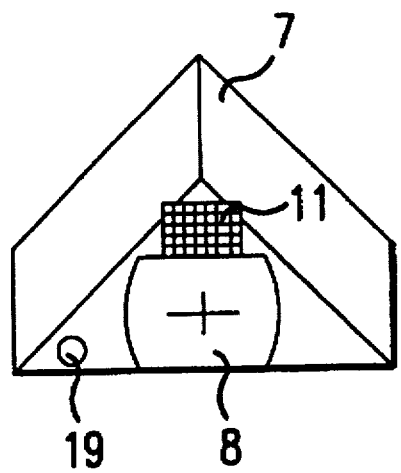
FIG. 3 is a schematic view of the second embodiment for the positioning of the photometry elements of this invention in a top view.

FIG. 3 is a second embodiment of the positioning of the photometry elements 11 and 19. In this embodiment, only one third photometry element 19 is used. This diagram is a view of the pentagon prism 7 from the eyepiece lens 8 side. While the photometry element 11 measures light using light rays at the top of the eyepiece lens 8, the other photometry element 19 measures light using light rays on the left and right sides of the eyepiece lens 8. Measurement of the light is accomplished without dividing the area into regions, but taking it as a single region.

FIG. 4 is a drawing of the division pattern when the brightness inside the screen 6 is measured. The photometry element 11 measures the brightness of the subject field on the screen 6 via the collection lens 10 by dividing the area into a grid, as shown in FIG. 4. Preferably, the division pattern contains 345 divisions, 23 horizontally by 15 vertically. The address (n, m) of each region is determined, for example, by the lower left as (1,1) and the upper right as (23,15) when the camera body 1 is held in a horizontal position.

FIG. 5 is a drawing showing the positioning of the color filter placed on each photoelectric conversion element in the photometry element 11.

Three color filters for red, green and blue are placed on the 345 regions explained in FIG. 4. As shown in FIG. 5, three light receiving elements below these filters provide a structure that can measure the light by separating it into the three primary colors as is known. Alternatively, these three color filters may also be complimentary colors, instead of the primary colors red, green and blue.

Figure 6:
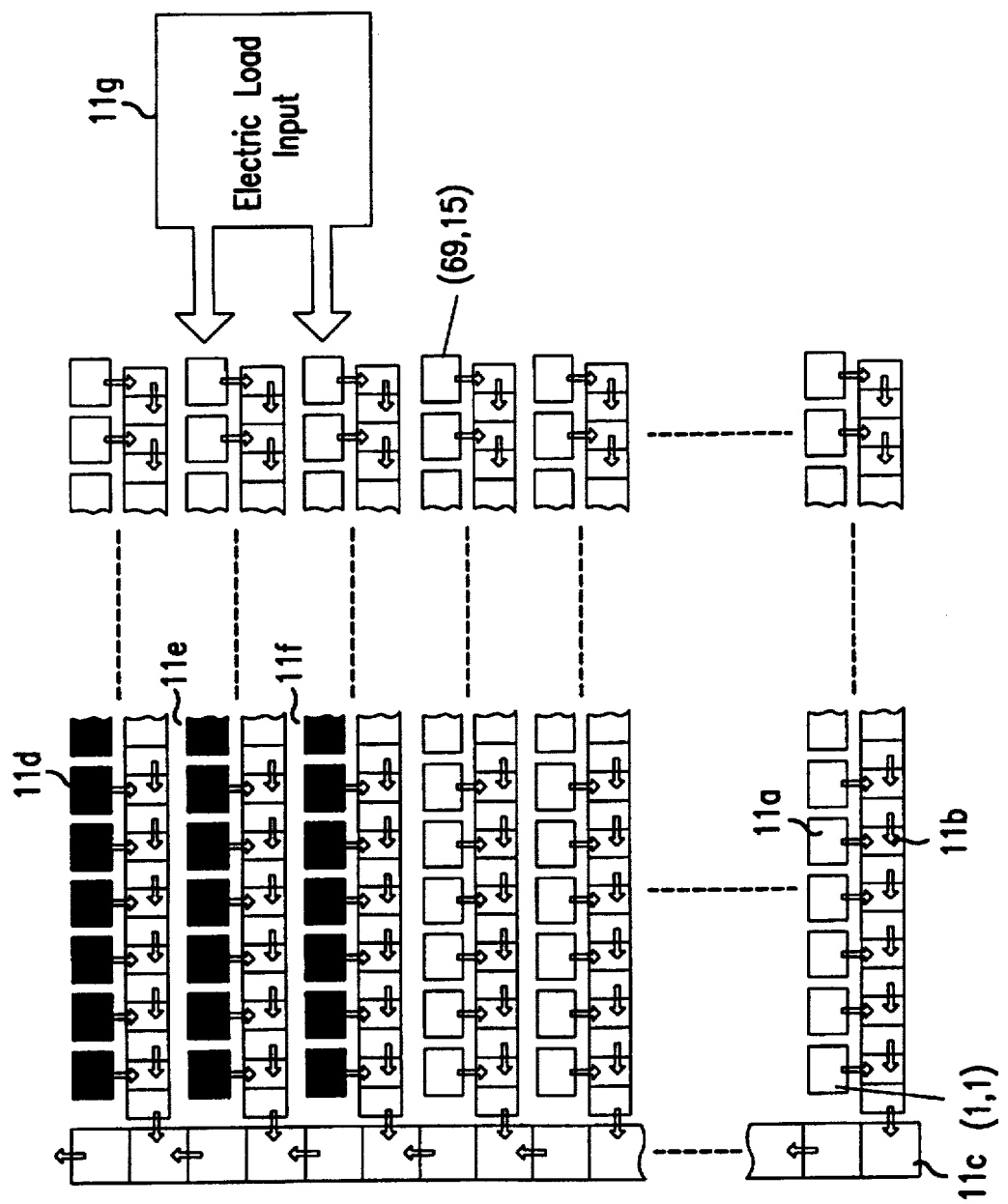
FIG. 6 is a drawing showing the structure of the photometry element according to this invention.

FIG. 6 shows the structure of the photometry element 11. Photoelectric conversion elements (photodiodes) 11a are arranged in 69 horizontal rows and 15 vertical columns. Below each horizontal row is a shift register 11b (called an H register). An electric charge generated by photoelectric conversion in the photo-diodes 11a is stored for a fixed time in a storage component (not shown in the drawing) and then transferred to the H register 11b all at once. The H register 11b moves the charge successively to the left with each clock pulse. A V register 11c is located at the left edge of the H registers, as seen in FIG. 6. The V register 11c transfers the charge received from each H register 11b upward and converts it into an electric voltage, using floating diffusion (not shown in the drawing), then sending it to an amplifier.

Optical black 11d shields the surface of the photo-diodes 11a from light, producing a dark signal. The parts that are not shielded function as described above, with the same method of reading. The amount of this dark signal is subtracted from the output of the photo-diodes 11a to produce an adjustment in the dark signal.

When light rays with a high degree of brightness exceeding a specified level illuminate some of the photodiodes 11a, an overflow is produced that, by means of the H register 11b, affects other output in the horizontal row containing the element illuminated by the light rays with the high degree of brightness. Furthermore, if the amount of this overflow is large, it passes from the H register 11b to the V register 11c and also has an affect on the other H registers 11b.

The other optical black components 11e and 11f also shield the surface from light, and the charge input component 11g inputs a fixed but differing amount of electric charge to each of the rows 11e and 11f. Because an output corresponding to the temperature of the elements can be obtained from the output of these rows, it is possible to correct temperature based on output variation that includes an amplification circuit (not shown in the drawing) that amplifies the photometry output of the photometry element 11. The reason that these two rows 11e and 11f exist is so that correction of the variation will include not only an offset correction of the level, but also a gamma correction of the inclination.

Figure 7:
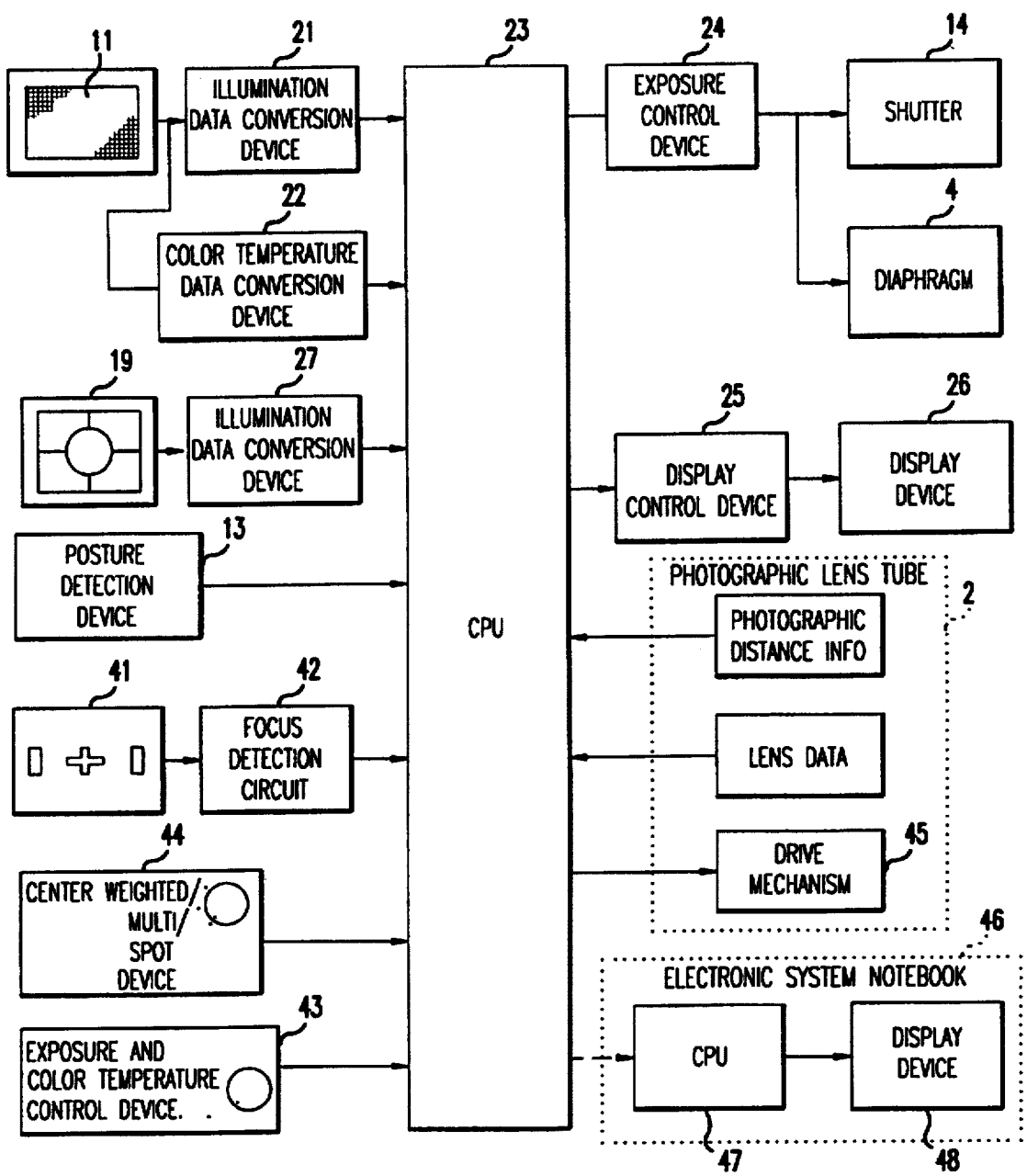
FIG. 7 is a block diagram of the control system according to this invention.

FIG. 7 is a block diagram of the control assembly of this invention. The photometry element 11 outputs a signal LV at an address (m,n) that is converted into a brightness value BV (m,n) by a well known illumination data conversion device 21. The brightness value BV is then input into a CPU 23. The output signal LV (m,n) is also converted into a color temperature CT by a well known color temperature data conversion device 22, and then input into the CPU 23. The contents of the color temperature data conversion device 22 are explained with reference to FIGS. 8 through 10.

The photometry element 19 outputs a signal CV (n) that is converted into a brightness value DV (n) by a well known illumination data conversion device 27 and is then input into the CPU 23.

The posture detection device 13 detects the posture of the camera body 1, and inputs the result into the CPU 23. The results of posture detection are divided into three postures: a horizontal position, a vertical position in which the pentagon prism 7 leans to the right side, and a vertical position in which the pentaprism leans to the left side 7.

Lens data from the photographic lens tube 2, such as the stop value of the diaphragm 4 and the photographic range information X obtained from the position of the photographic lens 3, are input into the CPU 23 inside the camera body 1.

The CPU 23 calculates the optimum exposure value (BVans) based upon the described pre-input information, the value being displayed by the display system 26 via the display control device 25. Because calculation of the optimum exposure value BVans is not directly related to this invention, a detailed description thereof has been omitted.

Subsequently, when a release button, not shown in the drawing, is depressed, the exposure control device 24 drives the shutter 14 and the diaphragm 4 to obtain the calculated exposure value BVans.

The focus detection system 41, 42 executes focus detection at positions corresponding to the left, center and right of the screen. The focus information is detected by a well known focus detection optical system 41 and is sent to the CPU 23 after being processed by a well known focus detection circuit 42. The focus position is computed in the CPU 23. In addition, the focus is adjusted as the drive mechanism 45, which is mounted in the photographic lens tube 2, drives the photographic lens 3.

The exposure and color temperature control device 43 is a system operated by the user, which allows the camera to be switched between the exposure meter and the color temperature meter.

Figure 15:
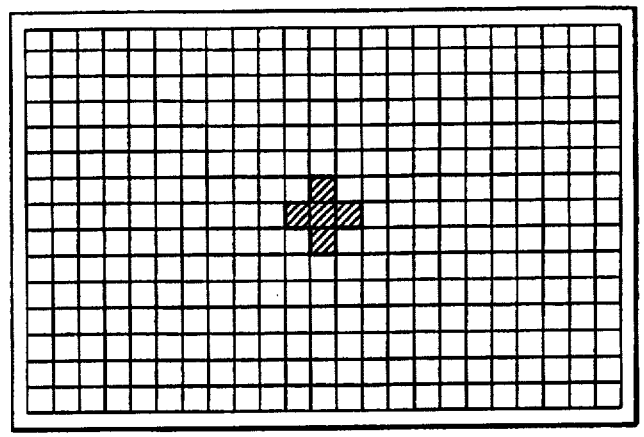
FIG. 15 is a graphical representation showing the exposure and color temperature detection regions when "spot" is selected.
Figure 16:
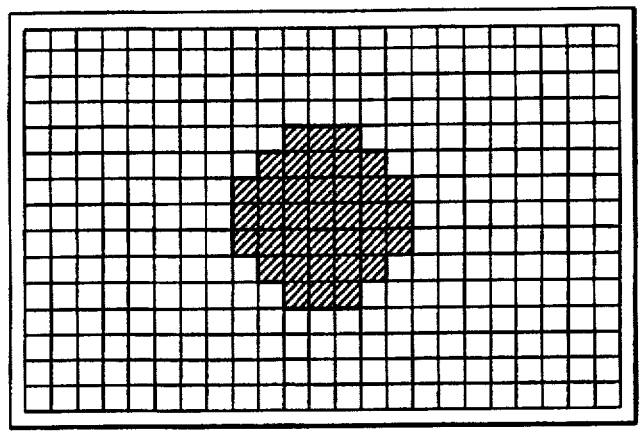
FIG. 16 is a graphical representation showing the exposure and color temperature detection regions when "central emphasis" is selected.
Figure 17:
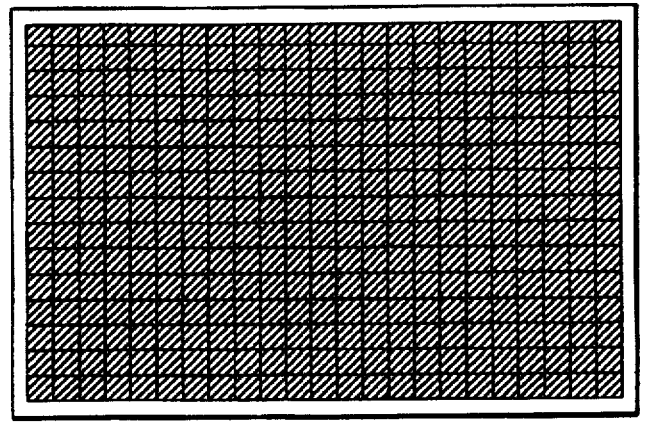
FIG. 17 is a graphical representation showing the exposure and color temperature detection regions when "multi" is selected.

The photometry mode switching system is a center weighted/multi/spot device 44, which is a system operated by the user and allows the light measurement regions that measure exposure and color temperature to be switched. When "spot" is selected, the camera is set so that the object of light measurement comprises 5 regions at the center of the screen, as shown in FIG. 15. When "center weighted" focusing is selected, the camera is set so that the object of light measurement comprises the 37 regions around the center of the screen, as shown in FIG. 16. When "multi" is selected, the camera is set so that the object of light measurement comprises all 345 regions composing the entire screen, as shown in FIG. 17. For instance, when "exposure" is selected with the exposure and color temperature control device 43 and "spot" is selected with the photometry mode switching system 44, light is measured in the five regions at the center, as shown in FIG. 15, and the exposure value is displayed based on that value. As another example, when "color temperature" is selected by the exposure and color temperature control device 43 and "center weighted" is selected in the photometry mode switching system 44, light is measured in the 37 regions around the center, as shown in FIG. 15, and the color temperature is computed and displayed based upon that value.

Figures 13, 14:
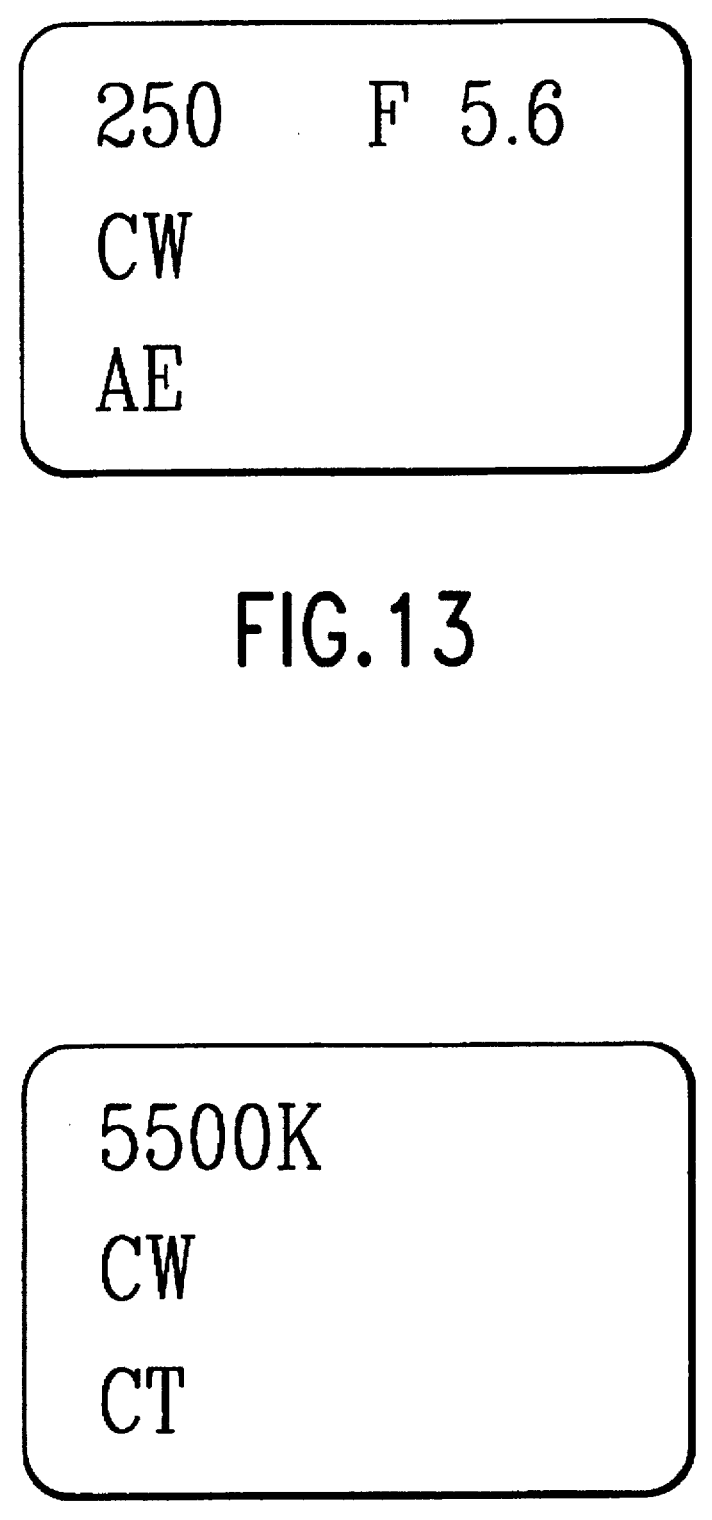

The display device 26 displays the shutter time, stop value, photometry mode, and AE (meaning that "exposure" has been selected with the exposure and color temperature control device 43), when "exposure" is selected with the exposure and color temperature control device 43, as shown in FIG. 13. In addition, the display device 26 displays the color temperature, photometry mode and CT (meaning that "color temperature" has been selected with the exposure and color temperature control device 43), when "color temperature" is selected with the exposure and color temperature control device 43, as shown in FIG. 14.

An electronic system notebook 46 comprises a CPU 47, a display device 48, and a keyed input system and memory system not shown in the drawing. The CPU 47 communicates with the CPU 23 in the camera and reads the color temperature measured by the color temperature data conversion device 22. Using the measured color temperature, the CPU 47 determines the recommended type of color conversion filter. Then, the display system 48 displays the recommended type of color conversion filter. Details of the determination of the recommended type of color conversion filter are discussed referring to FIG. 18.

Figure 8:
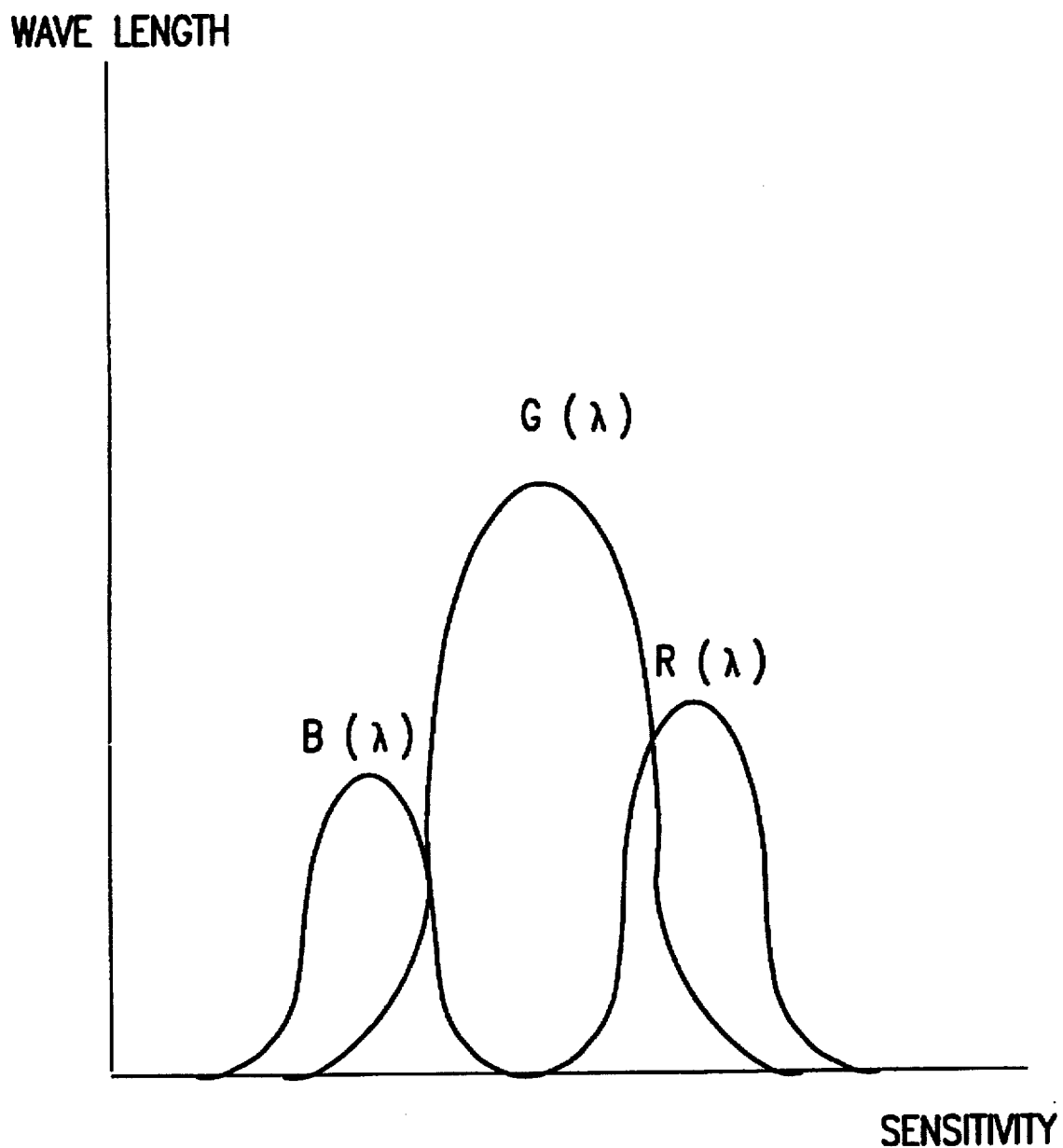
FIG. 8 is a graph showing the spectral sensitivity characteristics of the three colors.
Figure 9:
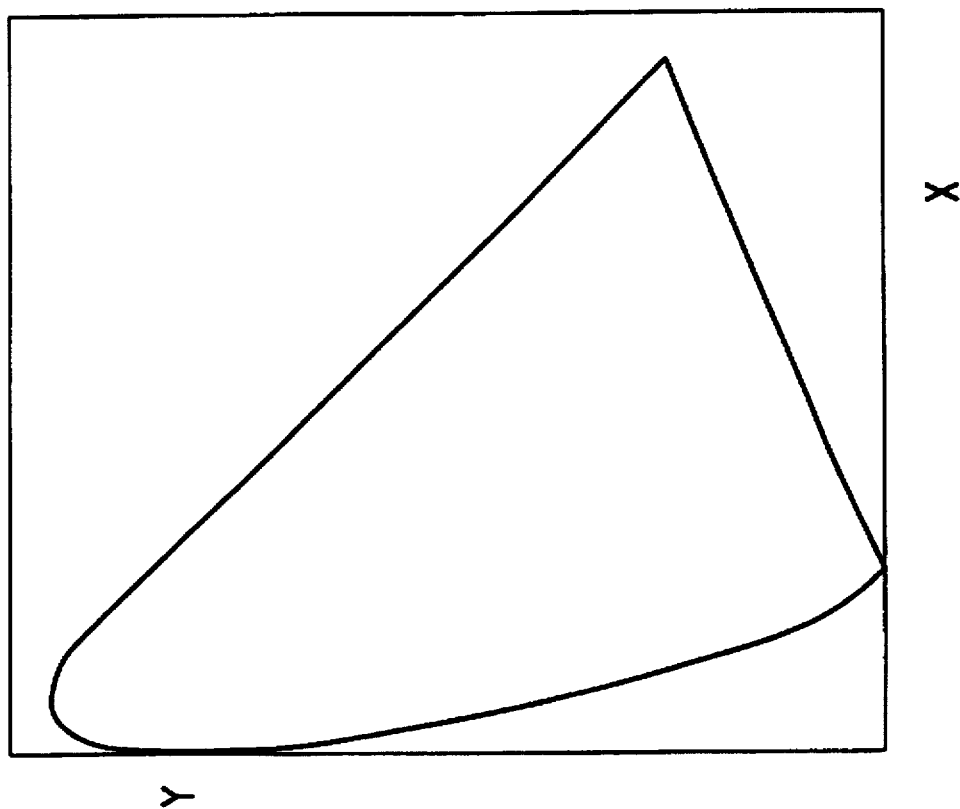
FIG. 9 is a graph of the x and y chromaticity coordinates.
Figure 10:
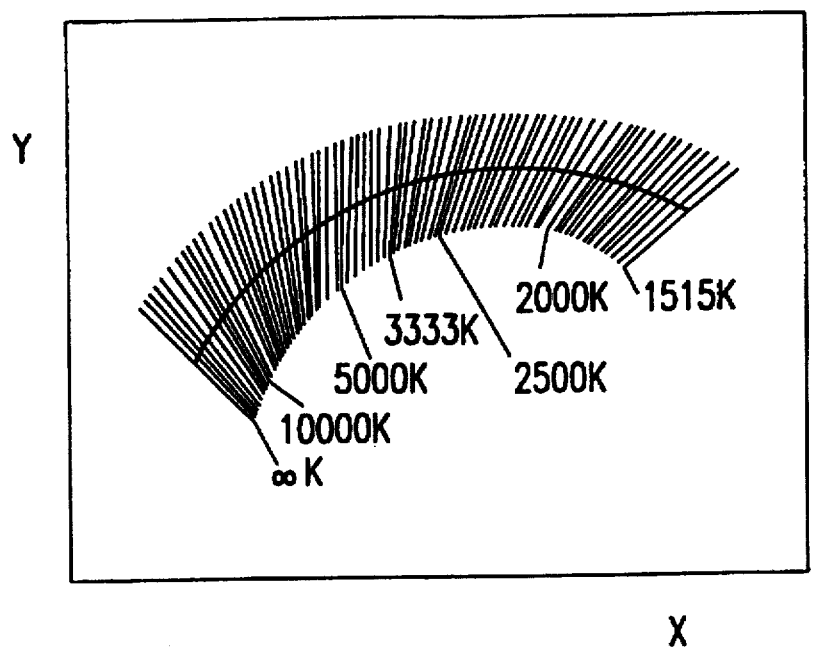
FIG. 10 is a graph showing iso-color temperature lines and the track of a perfectly radiant body.

FIGS. 8–10 explain the principle of the color temperature data conversion device 22.

FIG. 8 shows the spectral sensitivity characteristics of the three colors in FIG. 5, with wavelength on the horizontal axis and sensitivity on the vertical axis. Sensitivity to red is shown by $R(\lambda)$, sensitivity to green by $G(\lambda)$ and sensitivity to blue by $B(\lambda)$. With X, Y, and Z representing the output from the light receiving section with sensitivity $R(\lambda)$, $G(\lambda)$ and $B(\lambda)$, respectively, the chromaticity coordinates x and y are determined from the following relationships:

$$x=X/(X+Y+Z)$$

$$y=Y/(X+Y+Z)$$

FIG. 9 is a drawing of the color chromaticity x and y. All of the colors are positioned either inside this horseshoe shape or on the border. The color of the regions can be determined from the values of x and y found with the above equations.

FIG. 10 shows iso-color temperature lines and the track of a perfectly radiant body. The color temperature can be found by determining onto which iso-color temperature line the x and y values from the above equations fall.

With this invention, the color temperature of the 345 units corresponding to the 345 regions composing the screen, which is one-third of 1035, is found by the color temperature data conversion device 22. When "color temperature" is selected by the exposure and color temperature control device 43 and "spot" is selected with the photometry mode switching system 44, the color temperature displayed is found from the arithmetic mean of the color temperature in each of the five regions at the center of the screen, as shown in FIG. 15. When "center weighted" is selected with the photometry mode switching system 44, the color temperature displayed is found from the arithmetic mean of the color temperature in each of the 37 regions around the center of the screen, as shown in FIG. 16. When "multi" is selected with the photometry mode switching system 44, the color temperature displayed is found from the arithmetic mean of the color temperature in each of the 345 regions of the screen, as shown in FIG. 17.

Figure 11:
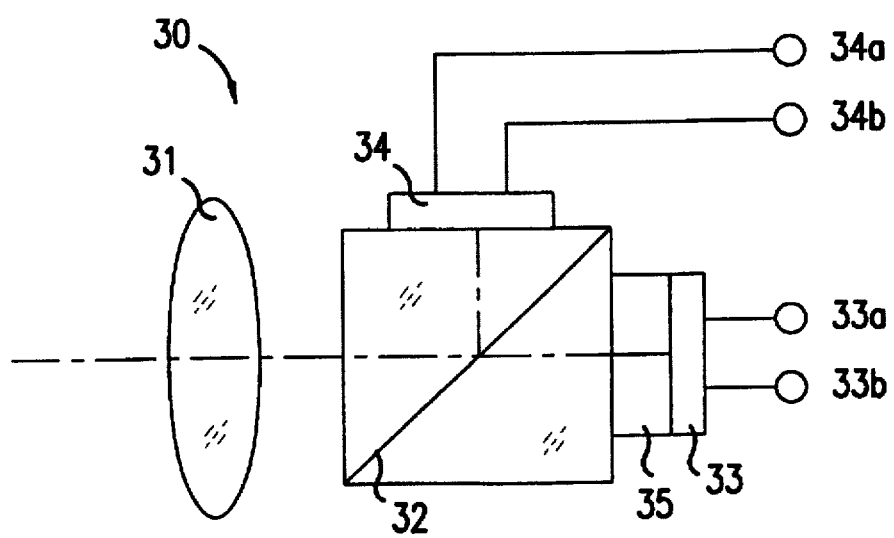
FIG. 11 is a schematic drawing explaining details of the photometry system used for measuring color temperature according to this invention.
Figure 12:
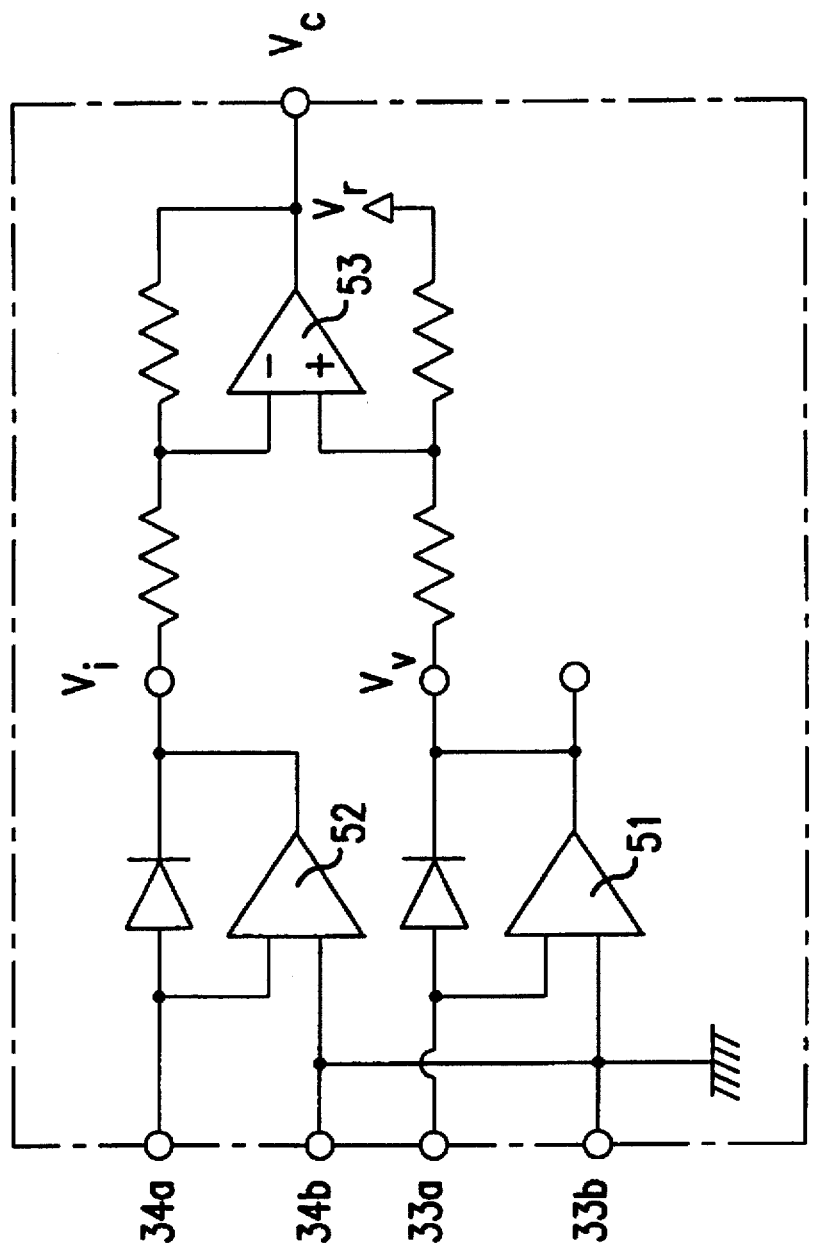
FIG. 12 is a schematic drawing showing the structure of the color temperature computation circuit according to this invention.

FIGS. 11 and 12 show a second embodiment of the calculation of color temperature. Details of the calculation of color temperature are disclosed in Japanese Laid-Open Application No. 58-86504, filed by the assignee of this application.

In contrast to the first embodiment, which utilizes the exposure computation photometry element 11 for measurement of color temperature, the second embodiment is characterized by a photometry system 30 seen in FIG. 11 for measuring color temperature that is separate from the photometry element used to compute exposure. The position of the photometry system 30 for measuring color temperature is preferably to the right side of the eyepiece lens in FIG. 3, in other words, on the side where the photometry element 19 is not located.

In addition, in the second embodiment, the regions that are the subject of light measurement are fixed and independent of operation of the photometry mode switching system 44, and correspond to the "spot" mode in FIG. 15.

FIG. 11 explains the details of the photometry system 30 for measuring color temperature. A collection lens 31 is disposed adjacent but spaced from a wavelength selection mirror 32. The wavelength selection mirror 32 is reflective to infrared light and transparent to visible light, so that light comprising mostly visible light is received at one light receptor 33, while light comprising mostly infrared light is received at another light receptor 34. In addition, with this photometry system 30, a filter 35, which only allows visible light to pass, is also installed, allowing simultaneous measurement of the exposure.

FIG. 12 shows the structure of the color temperature computation circuit. The assembly in FIG. 11 is connected to the circuit of FIG. 12 by terminals 33a, 33b, 34a, and 34b. Photoelectric current is generated by the light receptor 33 because light comprising mostly visible light is converted to a logarithm by a computation amplifier 51 and then converted to voltage Vv. Photoelectric current is generated by the light receptor 34 because light comprising mostly infrared light is converted to a logarithm by another computation amplifier 52 and then converted to voltage Vi. A differential amplifier 53 adds an appropriate offset voltage Vr to produce the "amount related to the color temperature" (Vc) using the following relationship:

$$Vc=(Vv-Vi)+Vr$$

A system that can measure color temperature in this manner is installed in the body of the camera itself, making it unnecessary to have a separate camera and color temperature meter. In addition, because the color temperature is measured by the photographic lens used for taking the photograph, and because it produces a measurement value that takes into consideration the color of the photographic lens itself, it is possible to obtain a measurement value that is more accurate than that obtained when a separate color temperature meter is used.

This system can also be expanded to utilize the integral color temperature measurement system to aid in the appropriate selection of color conversion filters based on the measured color temperature. To aid in the selection of an appropriate filter, the external electronic system notebook 46 electronically coupled to the CPU 23 is used in the preferred embodiment.

Figure 18:
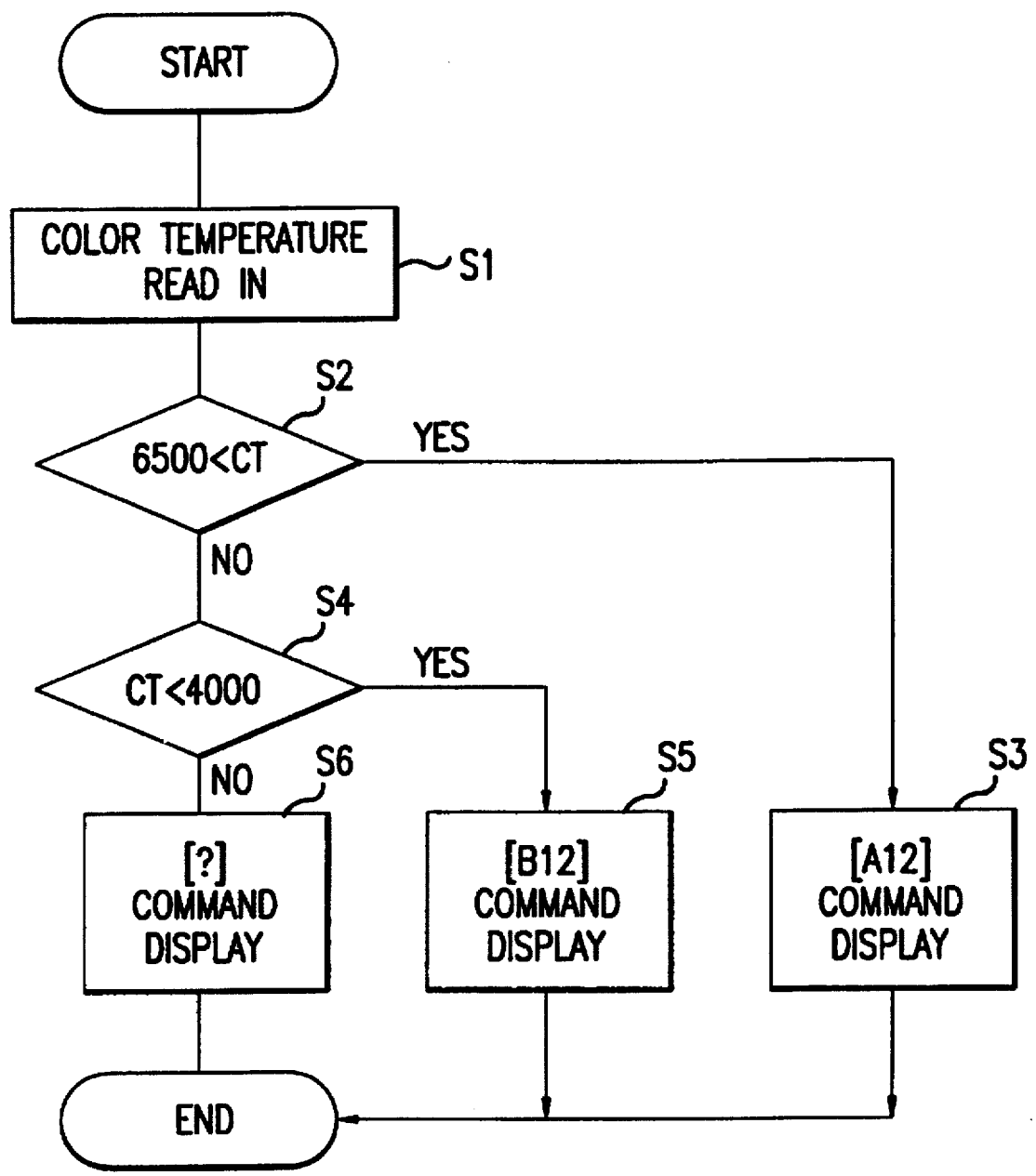
FIG. 18 is a flow diagram illustrating the electronic system notebook assembly.

FIG. 18 shows a flow chart for the CPU 47 in the electronic system notebook 46. In the following description, color conversion filters A12 and B12 are used as examples. The terms "A12" and "B12" are names given to color conversion filters sold by various camera manufacturers. In step S1, the color temperature CT measured by the color temperature data conversion device 22 is read via the CPU 23. The electronic system notebook 46 is detachably coupled to the CPU 23, and the CPU 23 is in communication with the CPU 47. The CPU 23 transmits the measured color temperature CT to the CPU 47. Then, in step S2, the CPU 47 determines whether or not the color temperature CT read is greater than 6,500K. If it is greater, the CPU 47 proceeds to step S3, and if it is equal to or less than 6,500K, the CPU 47 proceeds to step S4.

Figure 19:
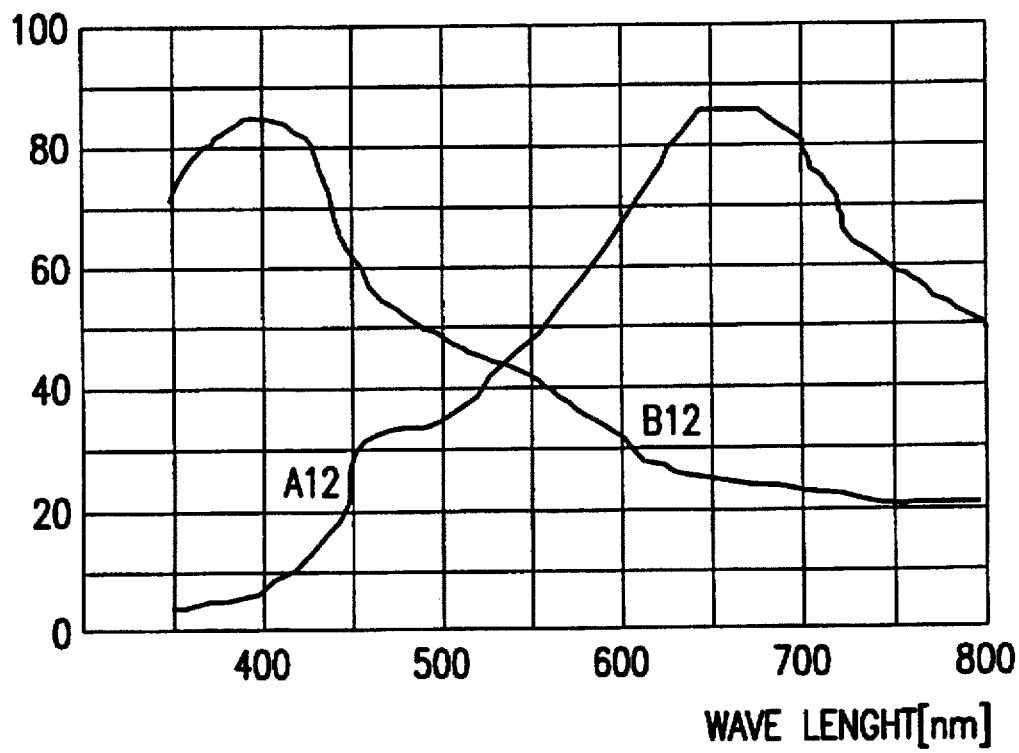
FIG. 19 is a graph showing the spectral transmittance of the filters according to this invention.

Step S3 applies when the color temperature is high and, in general, occurs in the shade in sunny weather, in cloudy weather and in rain, when the entire screen appears bluish. Here, the recommendation display will display color conversion filter A12 on display device 48, which corrects the color tone by lowering the color temperature and eliminates the blue tint. The spectral transmittance characteristic of color conversion filter A12 is shown in FIG. 19. In operation, the photographer should follow this recommendation display and mount color conversion filter A12 on the photographic lens 2.

In step S4, the CPU 47 determines whether or not the color temperature CT read is less than 4,000K. If it is less, the CPU 47 proceeds to step S5, and if it is greater than or equal to 4,000K, the CPU 47 proceeds to step S6.

Figure 20:
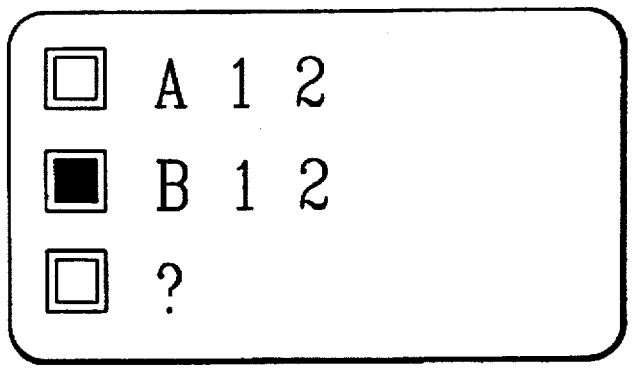
FIG. 20 is a drawing showing a sample display of the electronic system notebook.

Step S5 applies when the color temperature is low and, in general, occurs in the early morning and in the evening, when the entire screen appears reddish. Here, the recommendation display shows color conversion filter B12 on the display device 48, which corrects the color tone by raising the color temperature and eliminates the red tint. The spectral transmittance characteristic of color conversion filter B12 is shown in FIG. 19. FIG. 20 shows an example of this display when color conversion filter B12 is recommended.

Step S6 applies where the above conditions do not occur, when use of a color conversion filter is not necessary, or when the camera system cannot make a determination. In these cases, "?" is displayed on the display device 48.

In this embodiment, an electronic system notebook was used as an external device to determine the appropriate filter. However, it is clear that a personal computer or similar device could be used in a similar manner. Also, the CPU 23 could be adapted to execute the filter determination method described with respect to FIG. 19 without the use of external equipment.

In addition, this invention has been explained using two types of color conversion filters, but the number of types of filters is not limited to those described, and any suitable filter could be employed.

Furthermore, the recommendation display was accomplished using an external device with a display device 48, but the display system 26 inside the camera 1 could be used to display the recommendation.

With this invention as described above, it is possible for even photographers with little knowledge of color temperature to select the proper color conversion filter. This is because this invention creates a camera system in which a color temperature measurement mechanism installed inside the camera measures the color temperature of the light source illuminating the subject field. Then, a recommendation for selection of the proper filter is made and displayed based on the output of the color temperature measurement mechanism.

As described above, this invention creates a camera having a color temperature measurement mechanism for measuring the color temperature of the light source illuminating the subject field and a display mechanism for displaying color temperature information based on the output of said color temperature measurement mechanism. Therefore, it is unnecessary to carry a color temperature meter separate from the camera.

While advantageous embodiments have been chosen to illustrate the invention, it will be understood by those skilled in the art that various changes and modifications can be made therein without departing from the scope of the invention as defined in the appended claims.

What is claimed is:

1. A camera assembly for photographing a subject in a field or photographic film comprising:

a lens barrel including a photographic lens; and a body coupled to said lens tube including a photometry element that measures colors in the subject field from light rays that have passed through said photographic lens, a color temperature data conversion device coupled to said photometry element that converts the measured colors into a color temperature, a controller coupled to said color temperature data conversion device that determines an optimum exposure value based on the color temperature, a filter determination device coupled to said controller that determines a color conversion filter to be laced over said photographic lens based on the color temperature and a display coupled to said controller that displays the optimum exposure value and the determined color conversion filter.

2. The camera assembly of claim 1 wherein said filter determination device is integral with said body.

3. The camera assembly of claim 1 wherein said filter determination device is detachable from said body and includes a separate controller in selective communication with said controller in said body.

4. The camera assembly of claim 3 wherein said display comprises a first display that displays the optimum exposure value and a second separate display in said detachable filter determination device that displays the color conversion filter determination.

5. The camera assembly of claim 1 wherein said filter determination device is an external electronic system notebook.

6. The camera assembly of claim 1 wherein said color temperature data conversion device comprises CCDs.

7. The camera assembly of claim 1 wherein said photometry element measures brightness of light in the subject field and said camera assembly further includes an illumination data conversion device coupled to said photometry element and said controller that determines a brightness value based on the measured brightness and transfers the brightness value to the controller to determine the optimum exposure value.

8. The camera assembly of claim 7 further comprising an exposure and color temperature control device coupled to said controller that selects between brightness measurement and color measurement.

9. The camera assembly of claim 1 further comprising an additional photometry element that measures brightness of light in the subject field and an illumination data conversion device coupled to said additional photometry element and said controller that determines a brightness value based on the measured brightness and transfers the brightness value to the controller to determine the optimum exposure value.

10. The camera assembly of claim 9 further comprising an exposure and color temperature control device coupled to said controller that selects between said photometry element that measures color and said additional photometry element that measures brightness.

11. The camera assembly of claim 1 further comprising a posture detecting device coupled to said camera body and in communication with said controller that detects posture of said body and transmits a signal indicative of the posture to said controller to determine the optimum exposure value.

12. The camera assembly of claim 1 wherein said lens tube comprises a ROM including photographic distance data and lens data, said ROM being in communication with said controller to transmit data to said controller to determine the optimum exposure value.

13. The camera assembly of claim 1 further comprising a photometry mode switching system coupled to said controller that selects different regions in the subject field to be measured by said photometry element.

14. The camera assembly of claim 13 wherein said photometry mode switching system selects between a spot region, a center region and the entire region of the subject field.

15. A camera assembly for photographing a subject in a field or photographic film comprising:
a lens means for focusing rays of light from the photographic subject; and
a body means for housing photographic elements coupled to said lens means including photometry means for measuring colors in the subject field from light rays that have passed through said lens means, color temperature data conversion means coupled to said photometry means for converting the measured colors into a color temperature, control means coupled to said color temperature data conversion means for determining an optimum exposure value based on the color temperature, a filter determination means coupled to said control means for determining a color conversion filter to be placed over said lens means based on the color temperature, and display means coupled to said controller for displaying the optimum exposure value and the determined color conversion filter.

16. The camera assembly of claim 15 wherein said filter determination means is integral with said body means.

17. The camera assembly of claim 15 wherein said filter determination means is detachable from said body means and includes a separate control means in selective communication with said control means in said body means.

18. The camera assembly of claim 17 wherein said display means includes a first display means for displaying the optimum exposure value and a second display means for displaying the color conversion filter determination, wherein said second display means is disposed in said detachable filter determination means.

19. The camera assembly of claim 15 wherein said filter determination means is an external electronic system notebook.

20. The camera assembly of claim 15 wherein said photometry means measures brightness of light in the subject field and said camera assembly further includes an illumination data conversion means coupled to said photometry means and said control means for determining a brightness value based on the measured brightness and transferring the brightness value to the control means to determine the optimum exposure value.

21. The camera assembly of claim 20 further comprising an exposure and color temperature control means coupled to said control means for selecting between brightness measurement and color measurement.

22. The camera assembly of claim 15 further comprising an additional photometry means for measuring brightness of light in the subject field and an illumination data conversion means coupled to said additional photometry means and said control means for determining a brightness value based on the measured brightness and transferring the brightness value to the control means for determining the optimum exposure value.

23. The camera assembly of claim 22 further comprising an exposure and color temperature control means coupled to said control means for selecting between said photometry means for measuring color and said additional photometry means for measuring brightness.

24. The camera assembly of claim 15 further comprising a posture detecting means coupled to said camera body means and in communication with said control means for detecting posture of said body means and transmitting a signal indicative of the posture to said control means for determining the optimum exposure value.

25. The camera assembly of claim 15 wherein said lens means comprises a memory means for storing photographic distance data and lens data, said memory means being in communication with said control means for transmitting data to said control means for determining the optimum exposure value.

26. The camera assembly of claim 15 further comprising a photometry mode switching means coupled to said control means for selecting different regions in the subject field to be measured by said photometry means, the regions including a spot region, a center region and the entire region of the subject field.

27. A camera assembly for photographing a subject in a field or photographic film comprising:

a lens barrel including a photographic lens; and a body coupled to said lens barrel including a photometry element that measures colors and measures brightness of light in the subject field from light rays that have passed through said photographic lens, a color temperature data conversion device coupled to said photometry element that converts the measured colors into a color temperature, an exposure value data conversion device coupled to said photometry element that converts the measured light into a brightness value, a controller coupled to said color temperature data conversion device and said exposure value data conversion device that determines an exposure value based on the brightness value, and a single display coupled to said controller that displays information related to the exposure value and displays information related to the color temperature.

28. A camera for photographing an object field, comprising:

a color temperature measurement sensor for measuring the color temperature of a light source for illuminating the object field;

a determining device for determining filter information based on the measurement by said color temperature measurement sensor; and a display apparatus for displaying the filter information determined by said determining device.

29. The camera of claim 28, wherein the filter information comprises a color conversion filter to be placed over a lens of the camera.

* * * * *